(12) United States Patent
Ishikawa et al.

(10) Patent No.: US 9,348,212 B2
(45) Date of Patent: May 24, 2016

(54) IMAGE PROJECTION SYSTEM AND IMAGE PROJECTION METHOD

(71) Applicants: Masaaki Ishikawa, Kanagawa (JP); Satoshi Nakamura, Kanagawa (JP)

(72) Inventors: Masaaki Ishikawa, Kanagawa (JP); Satoshi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 144 days.

(21) Appl. No.: 14/191,846

(22) Filed: Feb. 27, 2014

(65) Prior Publication Data

US 2014/0268065 A1  Sep. 18, 2014

(30) Foreign Application Priority Data

Mar. 14, 2013  (JP) ................................. 2013-051153

(51) Int. Cl.
| | |
|---|---|
| *G03B 21/14* | (2006.01) |
| *H04N 9/31* | (2006.01) |
| *G03B 41/00* | (2006.01) |
| *G09G 5/00* | (2006.01) |

(52) U.S. Cl.
CPC *G03B 41/00* (2013.01); *G09G 5/00* (2013.01); *H04N 9/31* (2013.01); *H04N 9/3147* (2013.01); *H04N 9/3185* (2013.01); *H04N 9/3188* (2013.01); *G03B 21/147* (2013.01)

(58) Field of Classification Search
CPC ..... H04N 9/3147; H04N 9/3188; H04N 9/31; H04N 9/3194; H04N 9/3185; H04N 9/3197; G03B 41/00; G03B 37/04; G03B 21/147; G03B 21/14
See application file for complete search history.

(56) References Cited

U.S. PATENT DOCUMENTS

| | | | |
|---|---|---|---|
| 2004/0184010 A1* | 9/2004 | Raskar ................... | G03B 37/04 353/94 |
| 2006/0192925 A1* | 8/2006 | Chang .................... | G03B 37/04 353/94 |
| 2007/0052934 A1* | 3/2007 | Widdowson ......... | H04N 9/3147 353/94 |
| 2013/0222776 A1 | 8/2013 | Ishikawa | |

FOREIGN PATENT DOCUMENTS

JP  3908255  4/2007

* cited by examiner

*Primary Examiner* — William C Dowling
*Assistant Examiner* — Ryan Howard
(74) *Attorney, Agent, or Firm* — Oblon, McClelland, Maier & Neustadt, L.L.P.

(57) ABSTRACT

An image projection system projects a plurality of same images on a plane of projection by superimposition. The image projection system includes a plurality of projectors configured to have mutually different resolutions and project the plurality of same images on the plane of projection, and an image data output device configured to output to the plurality of projectors image data corresponding to the plurality of same images with the resolutions of the plurality of projectors, respectively.

8 Claims, 15 Drawing Sheets

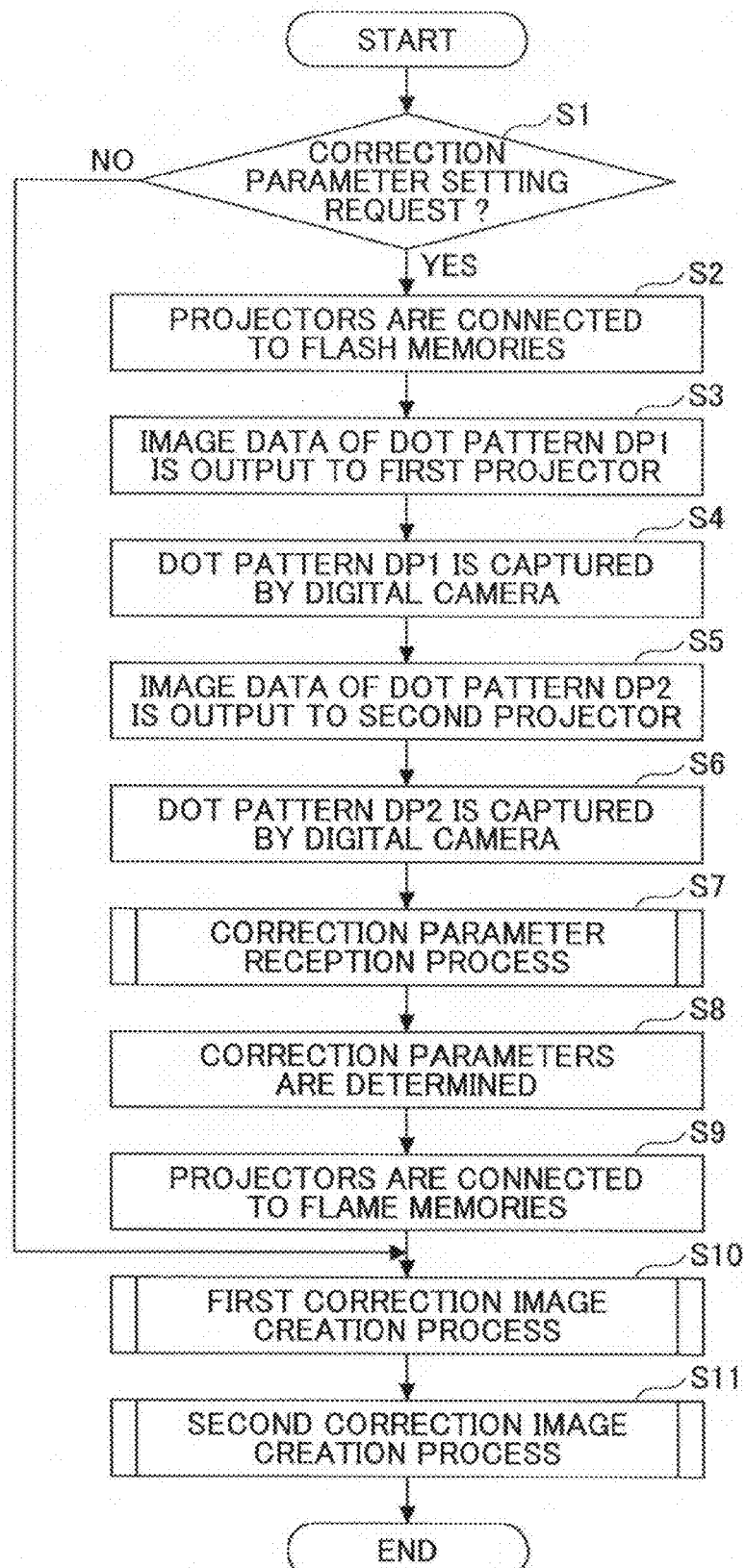

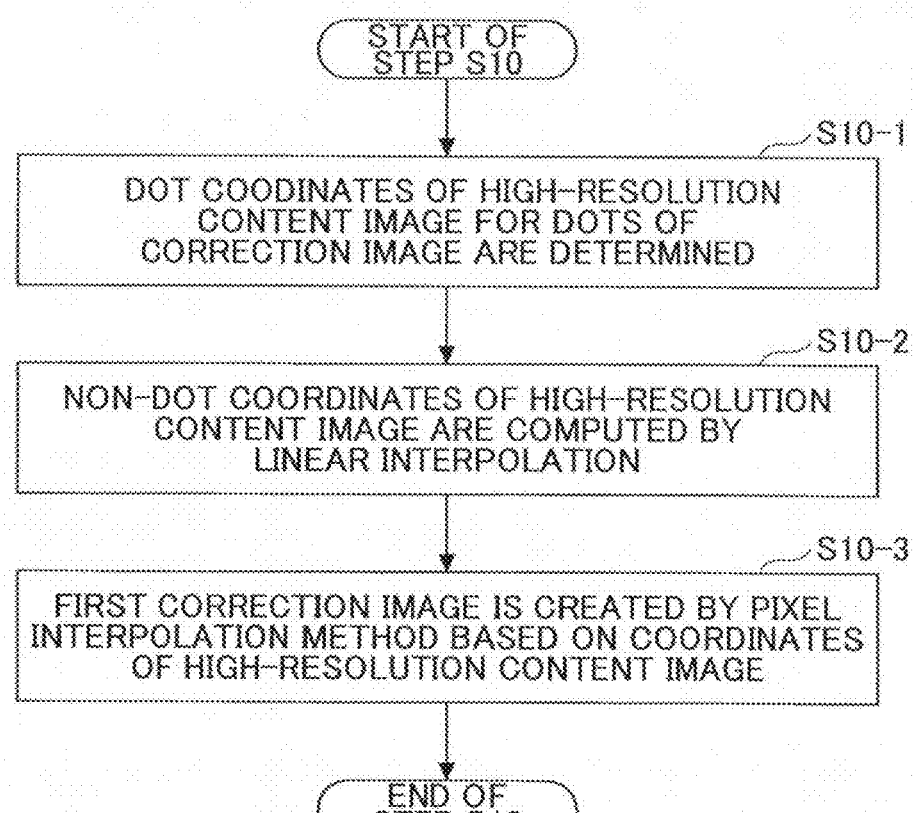

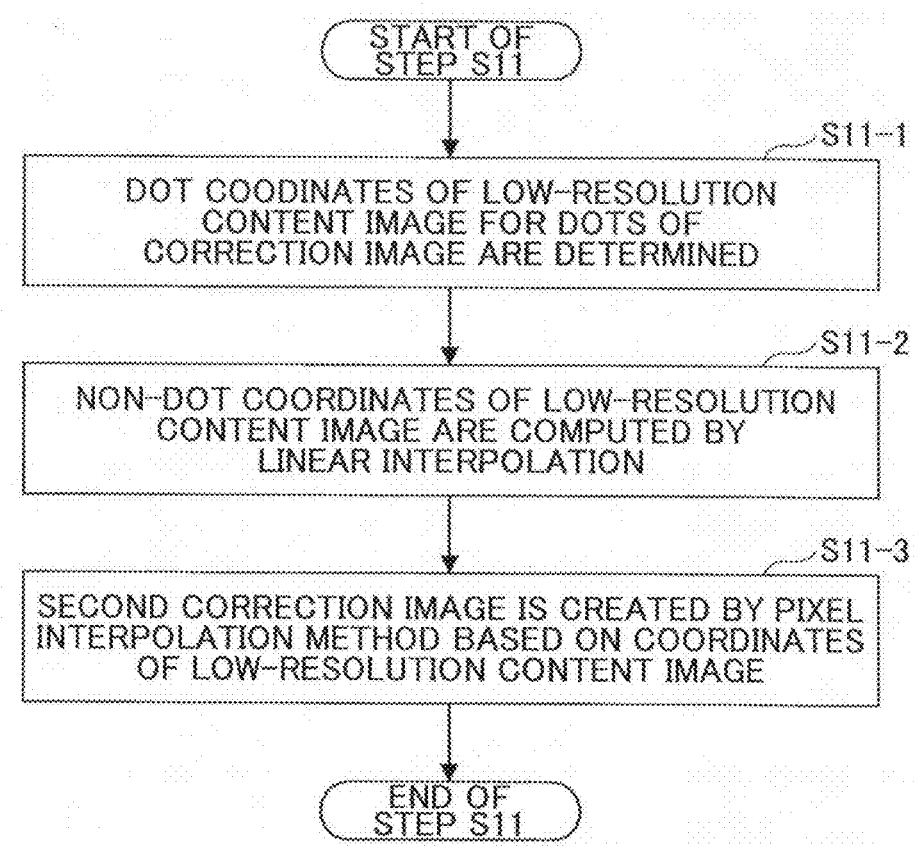

FIG.15A
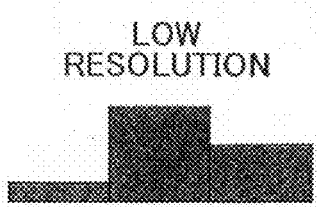
FIG.15B
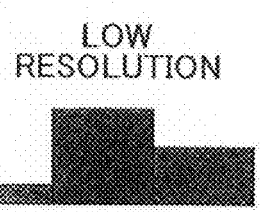
FIG.15C
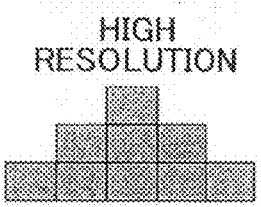
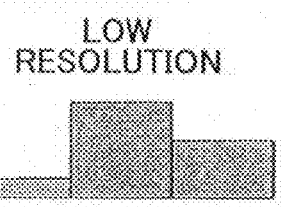
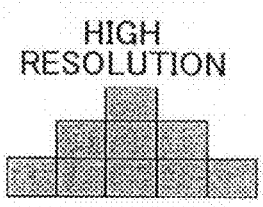
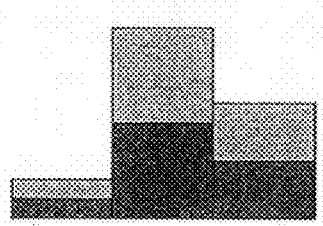
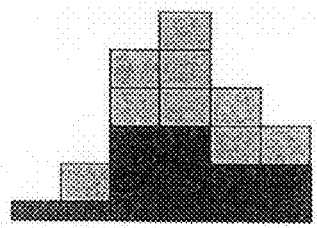

IMAGE PROJECTION SYSTEM AND IMAGE PROJECTION METHOD

BACKGROUND OF THE INVENTION

1. Field of the Invention

The present invention relates to an image projection system and an image projection method which are adapted to project two or more same images on a plane of projection by superimposition.

2. Description of the Related Art

Conventionally, an image projection system which projects two or more same images from two or more projectors on a plane of projection by superimposition (stack projection) is known. For example, see Japanese Patent No. 3908255.

In the image projection system disclosed in Japanese Patent No. 3908255, however, the combination of projectors usable for stack projection has not been flexible.

SUMMARY OF THE INVENTION

In an embodiment, the present invention provides an image projection system which projects a plurality of same images on a plane of projection by superimposition, the image projection system including: a plurality of projectors configured to have mutually different resolutions and project the plurality of same images on the plane of projection; and an image data output device configured to output to the plurality of projectors image data corresponding to the plurality of same images with the resolutions of the plurality of projectors, respectively.

Other objects, features and advantages of the present invention will become more apparent from the following detailed description when read in conjunction with the accompanying drawings.

BRIEF DESCRIPTION OF THE DRAWINGS

FIG. 6 is a flowchart for explaining a process performed by a controller of the overall image projection system.

FIG. 13 is a flowchart for explaining a first correction image generation process.

FIG. 14 is a flowchart for explaining a second correction image generation process.

FIGS. 15A, 15B and 15C are diagrams for explaining resolutions of projection images when stack projection is performed using two projectors in comparative example 1, comparative example 2, and the present embodiment, respectively.

DETAILED DESCRIPTION OF EMBODIMENTS

A description will be given of embodiments with reference to the accompanying drawings.

Figure 1:
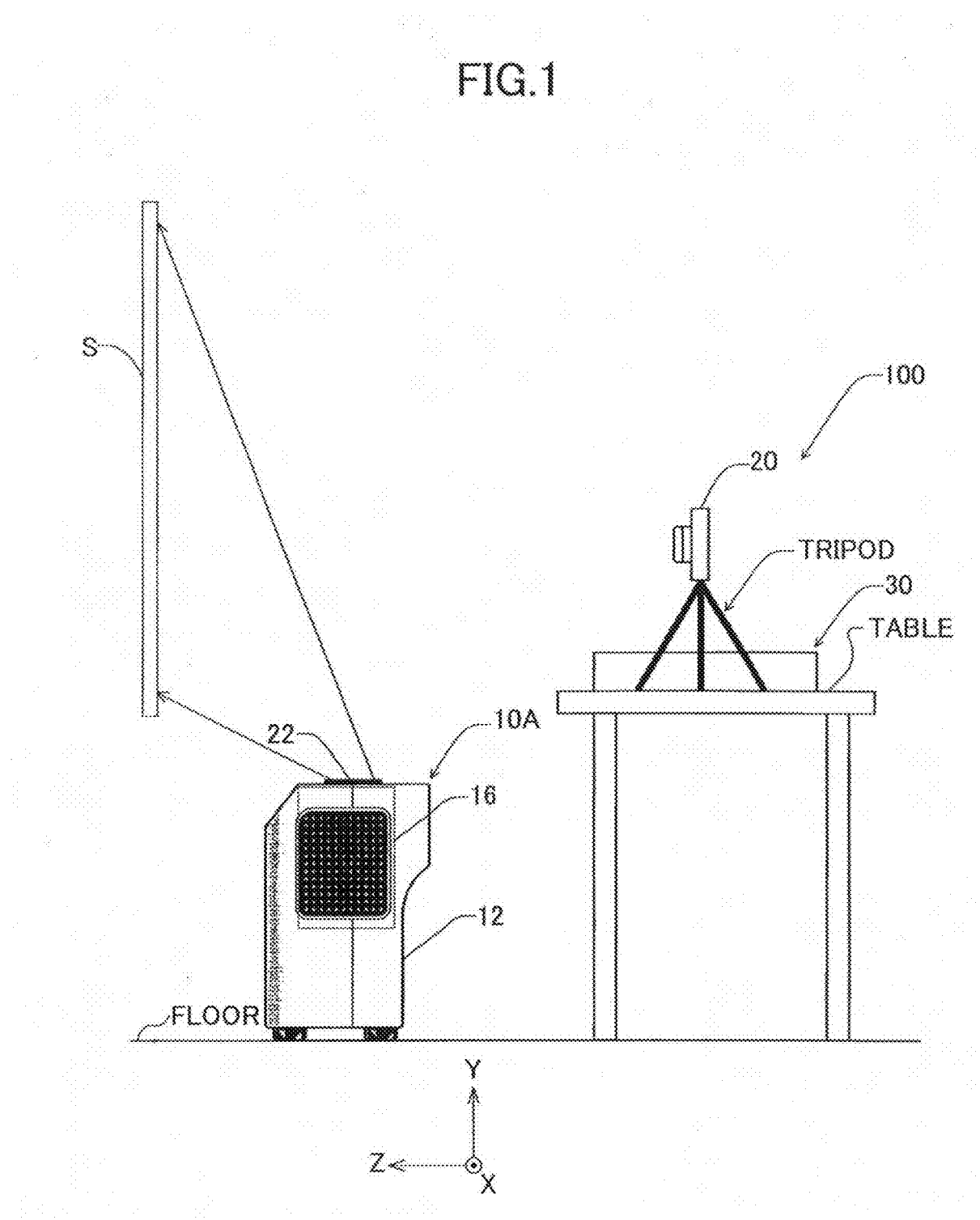
FIG. 1 is a side view of an image projection system according to an embodiment.

FIG. 1 is a side view of an image projection system 100 according to an embodiment. In the following, an XYZ three-dimensional rectangular coordinate system in which the Y axis direction is set to be parallel to a vertical direction as shown in FIG. 1 is used.

As shown in FIG. 1, the image projection system 100 includes two projectors 10A and 10B (the projector 10B hidden by the projector 10A is not illustrated), a digital camera 20, and a PC (personal computer) 30. In the following, the projector 10A will be referred to as a first projector 10A and the projector 10B will be referred to as a second projector 10B. The PC 30 is a controller of the image projection system according to the embodiment.

For example, the first and second projectors 10A and 10B are arrayed in a line parallel to the X axis direction on a floor. In FIG. 1, the second projector 10B is disposed on the −X side of the first projector 10A and hidden by the first projector 10A. Typically, the first and second projectors 10A and 10B are arranged on the −Y/−Z side of a hung type screen S in proximity to each other at slanting downward portions of the screen S. In this example, the screen S has a rectangular configuration, a longitudinal direction of the screen S is set to be parallel to the X axis direction, and an aspect ratio of the screen S is set to 4:3.

The first and second projectors 10A and 10B have mutually different resolutions. In this example, the first projector 10A has a resolution higher than a resolution of the second projector 10B. Specifically, a resolution (real resolution) of the first projector 10A is 1280×800 pixels, and a resolution (real resolution) of the second projector 10B is 1024×768 pixels.

Figure 2:
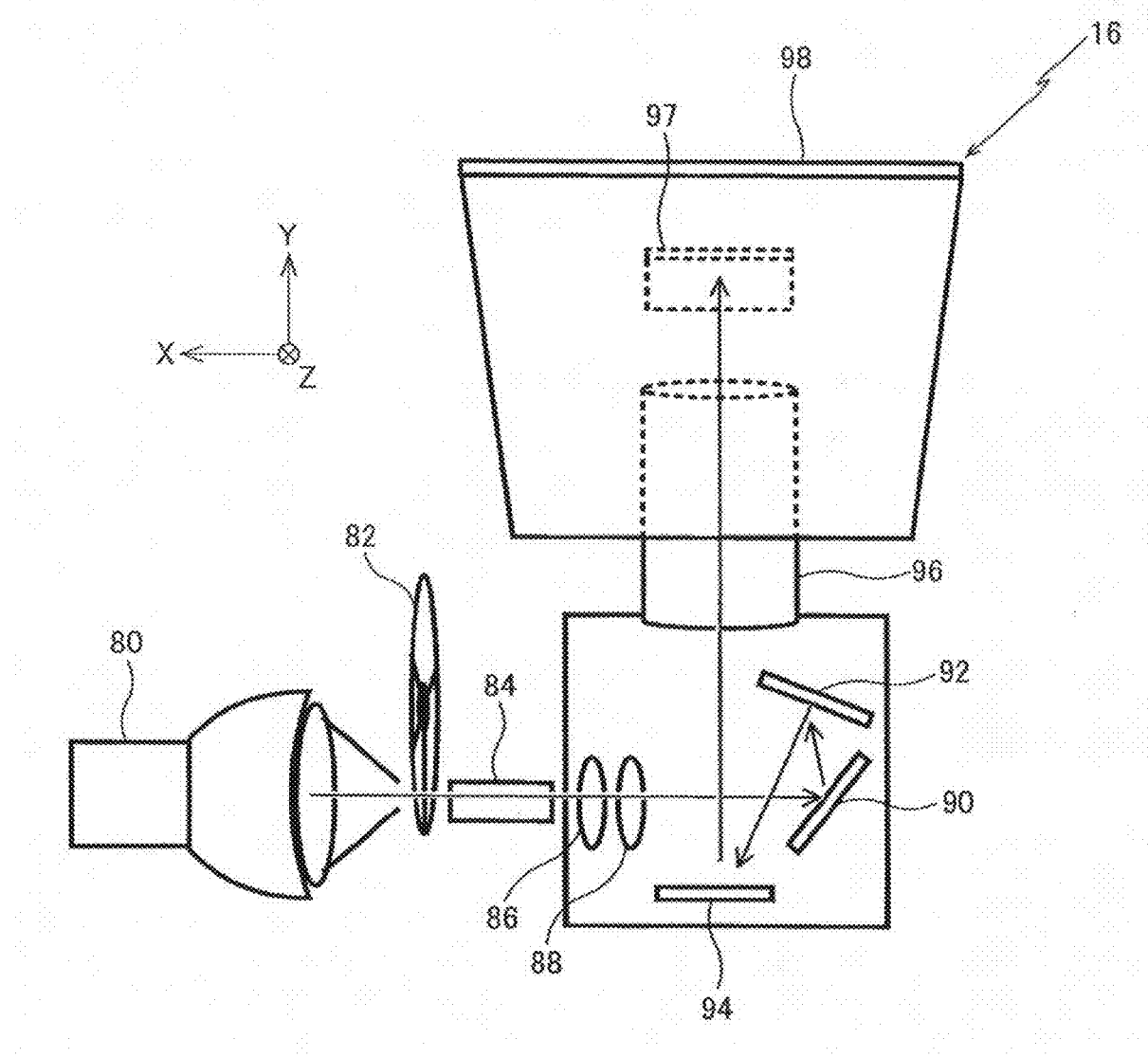
FIG. 2 is a diagram showing a projection portion of a projector.

Each of the projectors 10A and 10B includes a housing 12 and a projection portion 16 (see FIG. 2).

A transparent window member 22 that light penetrates is disposed in an upper wall of the housing 12 on the +Y side of the housing 12.

The projection portion 16 is accommodated in the housing 12 and configured to emit light which is modulated according to image data, onto the screen S via the transparent window member 22 so that an image is projected on a surface of the screen S (screen surface).

FIG. 2 is a diagram showing the projection portion 16 of the projector 10A or 10B. As shown in FIG. 2, the projection portion 16 includes a light source 80, a color wheel 82 as a light separation unit, a light pipe 84 as a light equalization unit, two condenser lenses 86, 88 as a light refraction unit, two mirrors 90, 92 as a light reflection unit, a digital micromirror device (DMD) 94 as a light modulation unit, a projection lens 96 as a light divergence and focusing unit, a mirror 97 as a light reflection unit, and a free-surface mirror 98 as a light divergence and reflection unit.

The projection lens 96 has an optical axis direction parallel to the Y axis direction and is implemented by two or more lens elements (not illustrated) which are arrayed at intervals of a predetermined distance along the optical axis direction. An optical path of the light from the light source 80 to the mirror 97 in the projection portion 16 is indicated by the arrows in FIG. 2.

In the projection portion 16, the light emitted from the light source 80 is incident on the color wheel 82. The incident light is separated into three color-component light beams by the color wheel 82 sequentially, and the color-component light beams are output by the color wheel 82 in the time sequence. Each color-component light beam from the color wheel 82 is incident on the light pipe 84. The luminance distribution of each color-component light beam from the color wheel 82 is equalized by the light pipe 84 and incident on the condenser lenses 86 and 88. After the position of a focusing surface is adjusted, each color-component light beam incident on the condenser lenses 86 and 88 is reflected by the mirrors 90 and 92 to enter the DMD 94. Each color-component light beam is modulated in accordance with the image information and reflected by the DMD 94 to enter the projection lens 96. Each color-component light beam entering the projection lens 96 is diverged and reflected by the mirror 97 to enter the free-surface mirror 98. Each color-component light beam entering the free-surface mirror 98 is diverged and reflected by the free-surface mirror 98, and the color-component light beam from the free-surface mirror 98 is projected through the transparent window member 22 in a slanting upward direction toward the screen S on the +Y/+Z side of the housing 12 (see FIG. 1). As a result, a color image or a monochrome image is projected on the surface of the screen S.

The above-described projection portion 16 is configured as a short focus system in which the focal position of the projection light is reduced. With a reduced projection distance, the projection portion 16 may project a color or monochrome image of an adequately large size on the screen S. In other words, the projection portion 16 is configured as a short focus system including an optical system in which a mirror having refractive power (the free-surface mirror 98) is provided. This mirror may have positive or negative refractive power. Because the optical system of the projection portion 16 includes the mirror having the refractive power, the size of an image projected on the screen S may be on the order of 80 inches even when a distance between the transparent window member 22 and the screen S is less than 50 cm.

The short-focus projector 10 as described above may project an image on the screen S from a position near to the screen S, and undesired intervention of a person or an object between the projector 10 and the screen S may be prevented, so that the image projected on the screen S may be prevented from being shaded by a person or an object intervening between the projector 10 and the screen S.

Further, in the image projection system 100 according to the embodiment, same images from the two projectors 10A and 10B with different resolutions are projected on the screen surface by superimposition such that the projected images are exactly in agreement (stack projection), and a bright clear projection image (with high contrast and good color reproduction property) may be obtained.

Figure 3:
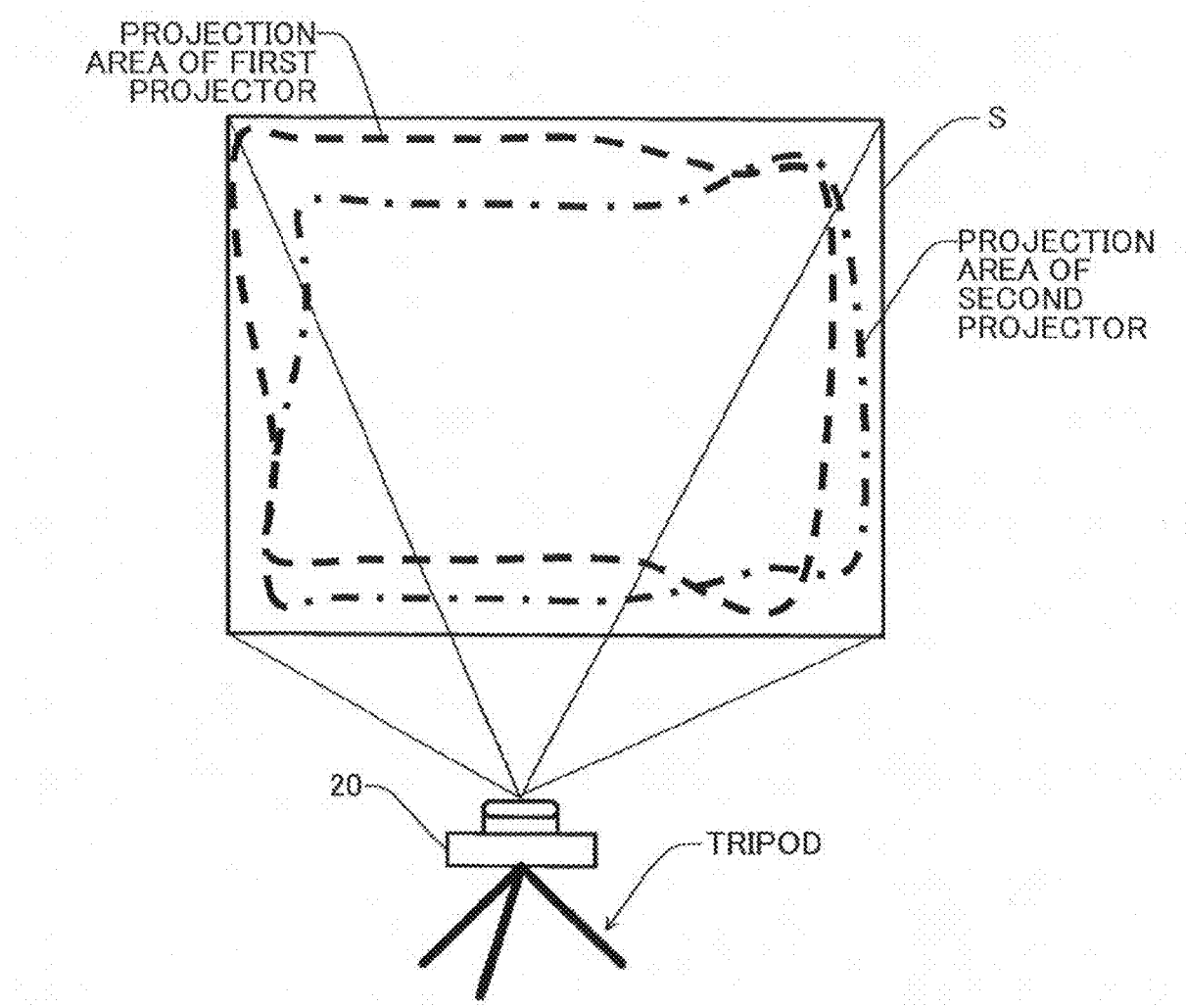
FIG. 3 is a diagram showing a state in which projection images in an OR area between projection areas of first and second projectors on a screen surface are taken by a digital camera.

The digital camera 20 is positioned so that an OR area between a projection area of the first projector 10A and a projection area of the second projector 10B on the screen surface may fit in an angle of view of an imaging lens of the digital camera 20 (see FIG. 3). For example, the digital camera 20 is supported on a table via a tripod so that the OR area may fit in the angle of view of the imaging lens of the digital camera 20. The digital camera 20 individually creates an image of a high-resolution dot pattern DP1 and an image of a low-resolution dot pattern DP2 projected on the screen surface in a time sequence by the first and second projectors 10A and 10B, and outputs the resulting image data to the PC 30 respectively.

The PC 30 is disposed on the table and connected to the projectors 10A, 10B and the digital camera 20 (for example, by USB connection).

Figure 4:
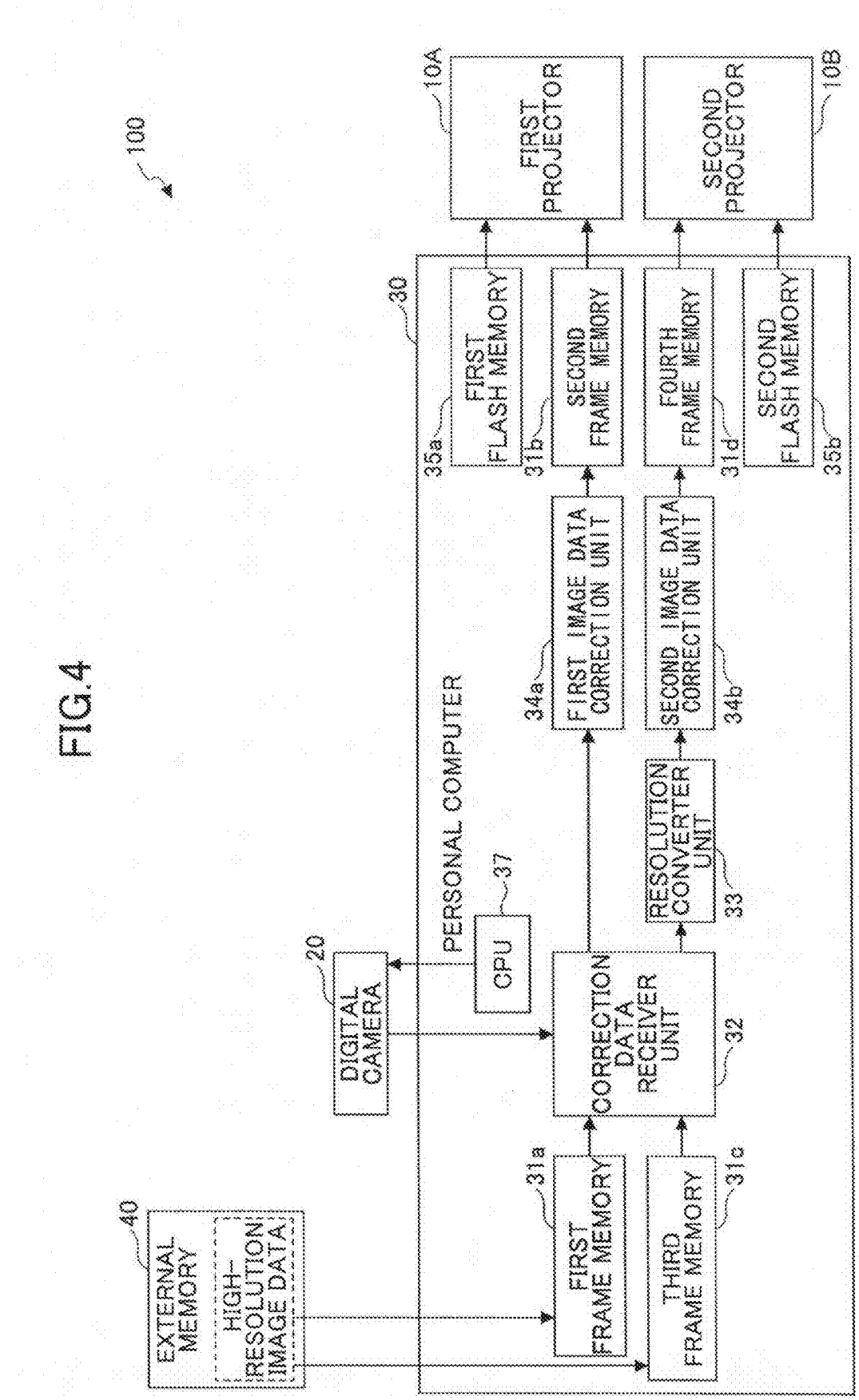
FIG. 4 is a block diagram showing a composition of a controller of the image projection system according to the embodiment.

FIG. 4 is a block diagram showing a composition of the PC 30 as the controller of the image projection system according to the embodiment. As shown in FIG. 4, the PC 30 includes a central processing unit (CPU) 37, first through fourth frame memories 31a-31d, a correction data receiver unit 32, a resolution converter unit 33, first and second image data correction units 34a and 34b, and first and second flash memories 35a and 35b.

The CPU 37 controls respective component parts of the overall PC 30 and controls the digital camera 20.

Figure 5A:
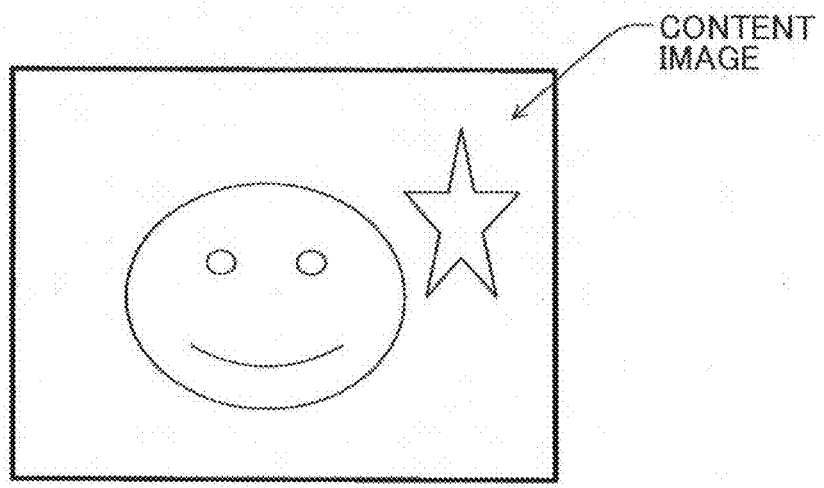
FIG. 5A is a diagram showing a content image on an external memory.

The first frame memory 31a temporarily stores image data supplied from an external memory 40 (a HDD, a USB memory, etc.) image by image, and sends the image data to the first image data correction unit 34a via the correction data receiver unit 32. The external memory 40 stores image data of a content image (see FIG. 5A) to be projected.

The third frame memory 31c temporarily stores image data supplied from the external memory 40 image by image, and sends the image data to the resolution converter unit 33 via the correction data receiver unit 32.

The correction data receiver unit 32 is configured to receive correction data (correction parameters) for correcting the image data from the external memory 40 based on image data of each of dot patterns DP1 and DP2 supplied from the digital camera 20.

In a case of a dot pattern projected on the screen surface, if the corresponding projector does not face the screen S properly, trapezoidal distortion may arise. In a case of a short focus projector, nonlinear geometric distortion may arise due to irregularities of the screen surface. To eliminate such distortion, the correction data receiver unit 32 is configured to receive a distortion correction parameter for correcting such distortion. In a case of the stack projection, it is necessary to correctly match the positions of images projected on the screen surface by two or more projectors without deviation. To eliminate a deviation, the correction data receiver unit 32 is configured to receive a deviation correction parameter for correcting a deviation of the images projected on the screen surface.

The resolution converter unit 33 is configured to convert a resolution of the image data from the third frame memory 31c into a resolution of the second projector 10B, and sends the resulting resolution to the second image data correction unit 34b. The resolution conversion of the resolution converter unit 33 may be implemented by a bilinear or bicubic pixel interpolation technique.

The first image data correction unit 34a is configured to correct the image data from the first frame memory 31a based on the correction data of the dot pattern DP1 received by the correction data receiver unit 32, and sends the image data to the second frame memory 31b. The first image data correction unit 34a may include a distortion correction unit configured to correct distortion of the image data and a deviation correction unit configured to correct a deviation of the image data.

The second image data correction unit 34b is configured to correct the image data from the resolution converter unit 33 based on the correction data of the dot pattern DP2 received by the correction data receiver unit 32, and sends the image data to the fourth frame memory 31d. The second image data correction unit 34b may include a distortion correction unit configured to correct distortion of the image data and a deviation correction unit configured to correct a deviation of the image data.

The second frame memory 31b temporarily stores the image data supplied from the first image data correction unit 34a image by image, and sends the image data to the first projector 10A.

The fourth frame memory 31d temporarily stores the image data supplied from the second image data correction unit 34b image by image, and sends the image data to the second projector 10B.

The first flash memory 35a stores the image data of the high-resolution dot pattern DP1. In this embodiment, the resolution of the dot pattern DP1 is the same as the resolution of the first projector 10A. The CPU 37 performs switching to select one of a first connection between the second frame memory 31b and the first projector 10A and a second connection between the first flash memory 35a and the first projector 10A.

The second flash memory 35b stores the image data of the low-resolution dot pattern DP2. As described above, the resolution of the dot pattern DP2 is lower than the resolution of the dot pattern DP1. In this embodiment, the resolution of the dot pattern DP2 is the same as the resolution of the second projector 10B. The CPU 37 performs switching to select one of a first connection between the fourth frame memory 31d and the second projector 10B and a second connection between the second flash memory 35b and the second projector 10B.

Figure 5B:
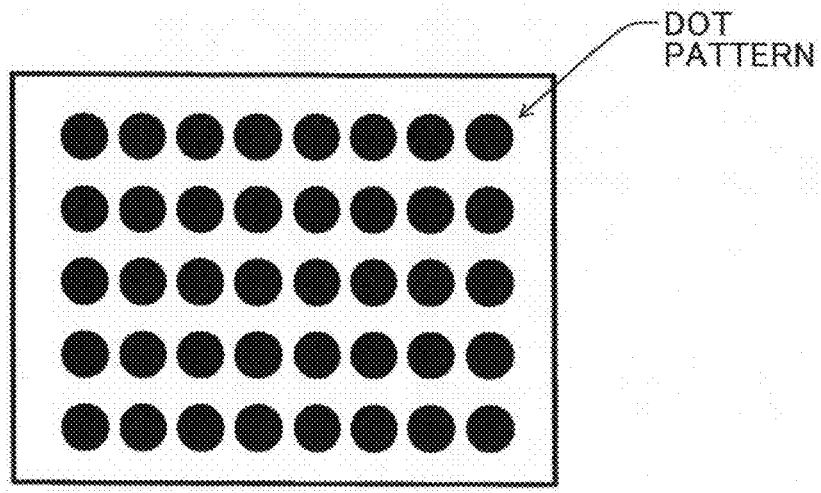
FIG. 5B is a diagram showing a dot pattern on a flash memory.

For example, each of the dot patterns DP1 and D2 includes a set of circular black dots (black circles) arrayed in a 8×5 matrix form, as shown in FIG. 5B. The low-resolution dot pattern DP2 is created by scaling using the resolution conversion of the high-resolution dot pattern DP1. The dot pattern DP2 includes a set of circular black dots arrayed in an 8×5 matrix form. In this way, if the number of dots included in each of the dot patterns DP1 and DP2 is the same, the dot size and the dot interval on the screen surface may be easily matched between the dot pattern DP1 and the dot pattern DP2. The dot interval corresponds to the accuracy of geometric correction, and the accuracy of geometric correction may be easily matched between the dot patterns DP1 and DP2 and the same dot size may be easily extracted in the dot extraction processing.

Next, a process performed by the image projection system according to the embodiment is explained with reference to FIG. 6. FIG. 6 is a flowchart for explaining the process performed by the image projection system according to the embodiment. The flowchart of FIG. 6 is equivalent to a processing algorithm of the CPU 37.

Initially, the first projector 10A is connected to the second frame memory 31b (the first connection) and the second projector 10B is connected to the fourth frame memory 31d (the first connection). A user may instruct to the CPU 37 selection of a correction parameter setting mode using an input device (for example, a keyboard, a mouse, etc.) which is connected to the PC 30. Initially, the correction parameters are set to default values (initial settings).

As shown in FIG. 6, in step S1, the CPU 37 determines whether a correction parameter setting request is received. When the selection of the correction parameter setting mode has not been requested by the user, a result of the determination in step S1 is in the negative and the control branches to step S10. When the selection of the correction parameter setting mode has been requested by the user, a result of the determination in step S1 is in the affirmative and the control branches to step S2.

In step S2, the CPU 37 switches the first connection between the frame memories 31b and 31d and the projectors 10A and 10B to the second connection between the flash memories 35a and 35b and the projectors 10A and 10B. Specifically, the CPU 37 performs switching to select the second connection between the first flash memory 35a and the first projector 10A by disconnecting the second frame memory 31b from the first projector 10A, and performs switching to select the second connection between the second flash memory 35b and the second projector 10B by disconnecting the fourth frame memory 31d from the second projector 10B.

In step S3, the CPU outputs the image data of the dot pattern DP1 to the first projector 10A. Specifically, the image data of the dot pattern DP1 are read from the first flash memory 35a and sent to the first projector 10A by the CPU 37. As a result, an image of the dot pattern DP1 is projected on the screen surface from the first projector 10A.

Figure 7A:
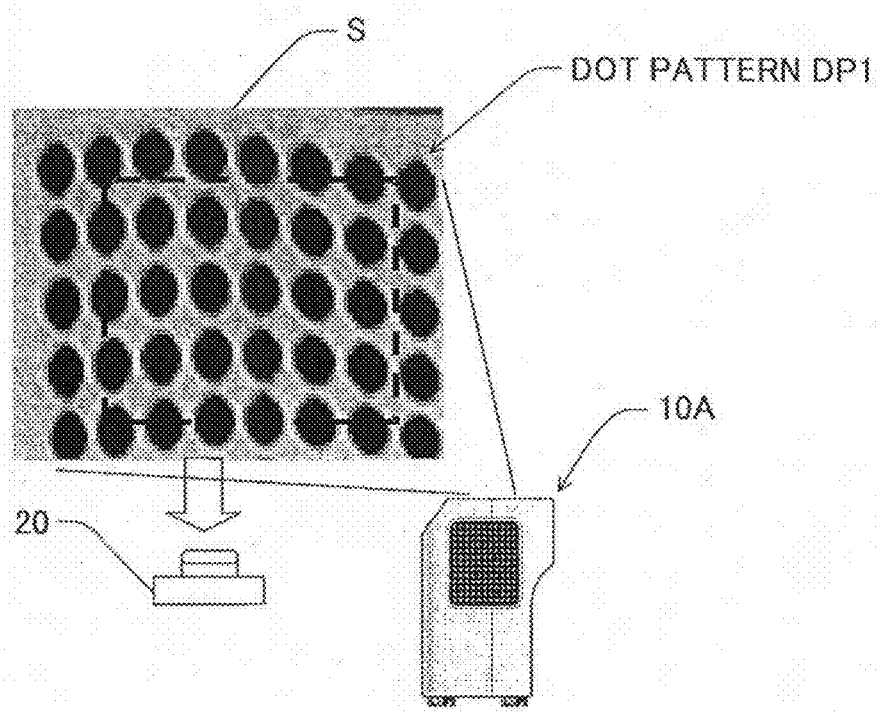
FIG. 7A is a diagram showing a state in which an image of a dot pattern DP1 projected by a first projector is created by the digital camera.

In step S4, an image of the dot pattern DP1 projected on the screen surface is created by the digital camera 20 (see FIG. 7A). The image data of the image created by the digital camera 20 are sent to the correction data receiver unit 32.

In step S5, the CPU 37 outputs the image data of the dot pattern DP2 to the second projector 10B. Specifically, the image data of the dot pattern DP2 are read from the second flash memory 35b and sent to the second projector 10B by the CPU 37. As a result, an image of the dot pattern DP2 is projected on the screen surface from the second projector 10B.

Figure 7B:
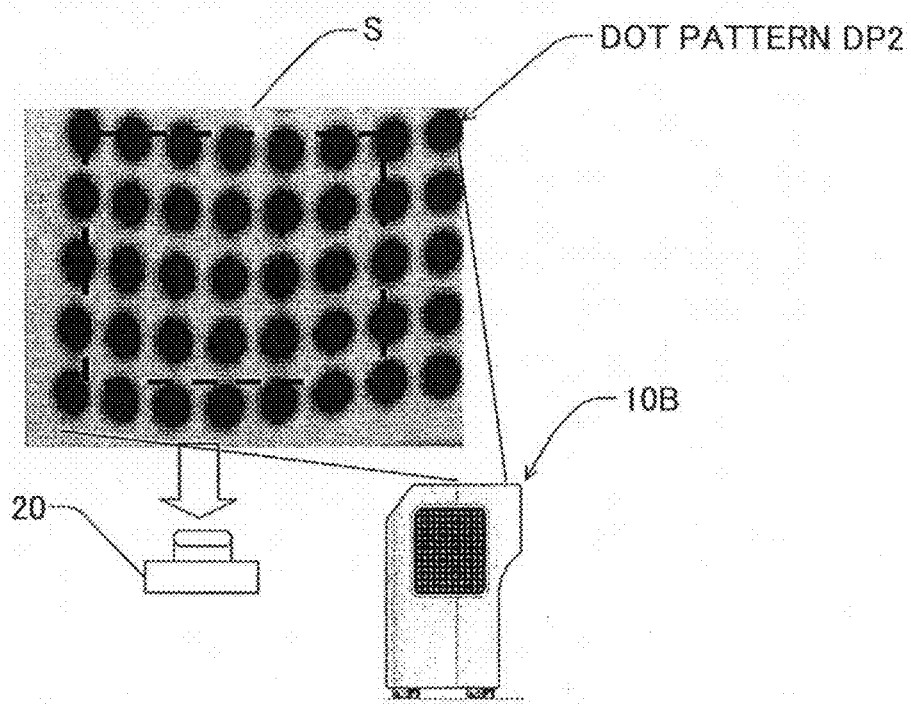
FIG. 7B is a diagram showing a state in which an image of a dot pattern DP2 projected by a second projector is created by the digital camera.

In step S6, an image of the dot pattern DP2 projected on the screen surface is created by the digital camera 20 (see FIG. 7B). The image data of the image created by the digital camera 20 are sent to the correction data receiver unit 32.

In step S7, the CPU 37 causes the correction data receiver unit 32 to perform a correction parameter reception process. The correction parameter reception process will be described later.

In step S8, the CPU 37 determines the correction parameters, which are sent to the first and second image data correction units 34a and 34b, by the received correction parameters, respectively.

In step S9, the CPU 37 switches the second connection between the flash memories 35a and 35b and the projectors 10A and 10B to the first connection between the frame memories 31b and 31d and the projectors 10A and 10B. Specifically, the CPU 37 performs switching to select the first connection between the second frame memory 31b and the first projector 10A by disconnecting the first flash memory 35a from the first projector 10A, and performs switching to select the first connection between the fourth frame memory 31d and the second projector 10B by disconnecting the second flash memory 35b from the second projector 10B.

Subsequently, the CPU 37 reads from the external memory 40 the image data of the content image whose resolution is the same as the resolution of the first projector 10A, and sends the image data to each of the first and third frame memories 31a and 31c. The image data sent to the first frame memory 31a are supplied to the first image data correction unit 34a via the correction data receiver unit 32. The image data sent to the third frame memory 31c are supplied to the second image data correction unit 34b via the correction data receiver unit 32 and the resolution converter unit 33.

In step S10, the CPU 37 causes the first image data correction unit 34a to perform a first correction image generation process. The first correction image generation process will be described later.

In step S11, the CPU 37 causes the second image data correction unit 34b to perform a second correction image generation process. The second correction image generation process will be described later.

Figure 8:
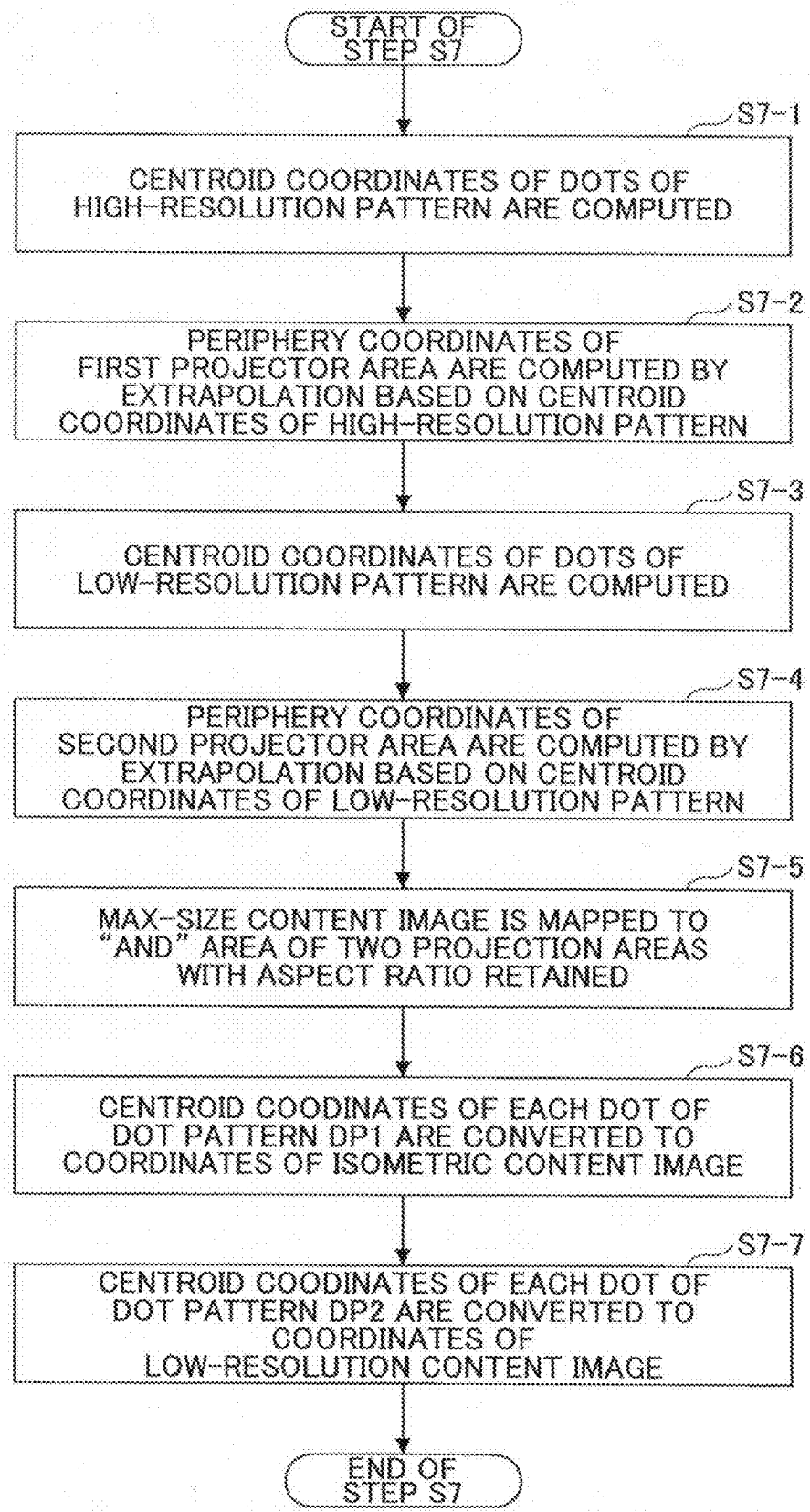
FIG. 8 is a flowchart for explaining a correction parameter reception process.

Next, the correction parameter reception process (step S7) performed by the correction data receiver unit 32 is explained with reference to FIG. 8. FIG. 8 is a flowchart for explaining the correction parameter reception process.

As shown in FIG. 8, in step S7-1, the correction data receiver unit 32 computes centroid coordinates of each of dots of the dot pattern DP1 in the created image. In the following, for the sake of convenience, the centroid of each of the dots of the dot pattern DP1 will also be referred to as a lattice point.

Figure 9A:
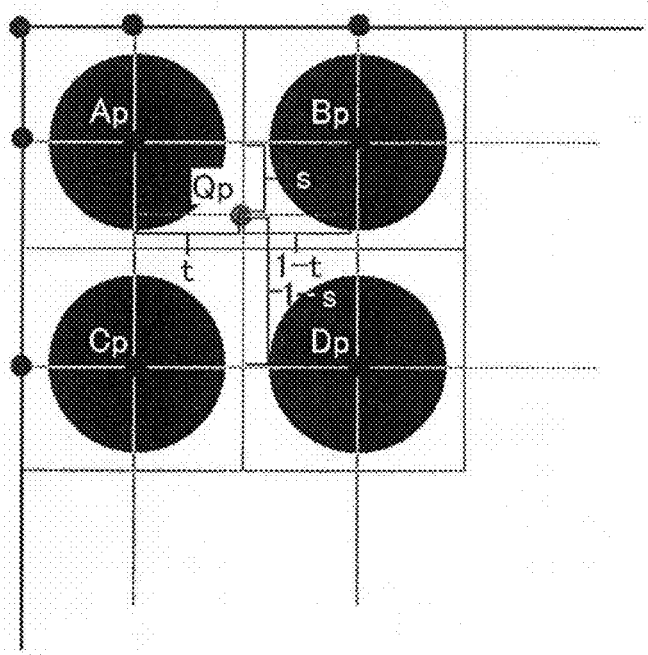
FIG. 9A is a diagram showing a part of an image of a dot pattern DP1 on a first flash memory.

The centroid coordinates of each dot of the dot pattern DP1 may be computed in decimal pixel accuracy (in sub-pixel accuracy). Specifically, by using a known method, binarization of the image data is performed, a group of black pixels is taken from the binary image data by pattern matching, and the centroid coordinates are computed in decimal pixel accuracy (see FIG. 9B). Similarly, the centroid coordinates of each dot of the dot pattern DP1 on the first flash memory 35a are computed (see FIG. 9A).

In step S7-2, the correction data receiver unit 32 computes the coordinates of the outer periphery of the projection area of the first projector 10A by extrapolation of the computed centroid coordinates of the respective dots.

Specifically, the coordinates of the outer periphery of the projection area of the first projector 10A are computed by a linear extrapolation of the computed centroid coordinates of the respective dots. Similarly, the coordinates of the outer periphery of the dot pattern DP1 on the first flash memory 35a are computed.

For example, a corresponding point $Q_C$ (see FIG. 9B) of the dot pattern DP1 in the image created by the digital camera 20 for a point $Q_P$ (see FIG. 9A) of the dot pattern DP1 on the first flash memory 35a may be determined based on a coordinate vector of respective centroid coordinates of four adjoining dots $A_C$, $B_C$, $C_C$, $D_C$ of the point $Q_C$ which are already computed, by the following formula (1):

$$Q_C = (1-s)((1-t)A_C + tB_C) + s((1-t)C_C + tD_C) \quad (1)$$

Figure 9B:
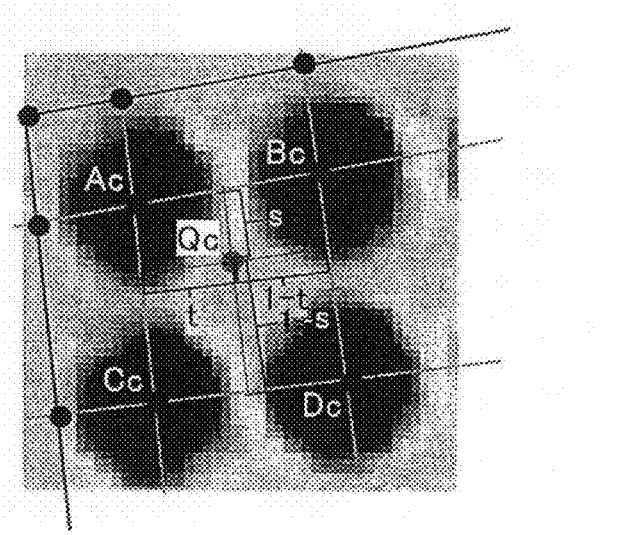
FIG. 9B is a diagram showing a part of an image of the dot pattern DP1 created by the digital camera.

It is assumed that the point $Q_P$ is a point obtained by internal division of four adjoining lattice points $A_P$, $B_P$, $C_P$, $D_P$ of the point $Q_P$ (the centroid coordinates of the dot are already computed) by $t:(1-t)$ $(0<t<1)$ in the x axis direction and internal division of the four adjoining lattice points by $s:(1-s)$ $(0<s<1)$ in the y axis direction. In the example of FIG. 9B, it is assumed that $-0.5<t<0$ and $-0.5<s<0$.

Although a nonlinear geometric distortion may arise in the overall dot pattern DP1, distortion which arises within a range (or its outer peripheral range) of a quadrilateral patch including 2×2 lattice points as a part of the dot pattern, whose area is sufficiently small, may be considered a linear geometric distortion.

In step S7-3, the correction data receiver unit 32 computes centroid coordinates of each of dots of the dot pattern DP2 in the created image. In the following, for the sake of convenience, the centroid of each of the dots of the dot pattern DP2 will also be referred to as a lattice point. The procedure of step S7-3 is essentially the same as that of step S7-1 described above.

In step S7-4, the correction data receiver unit 32 computes the coordinates of the outer periphery of the projection area of the second projector 10B by extrapolation of the computed centroid coordinates of the respective dots. The procedure of step S7-4 is essentially the same as that of step S7-2 described above.

Hence, the outer periphery coordinates of the projection areas of the projectors on the dot patterns in the created images are computed based on the coordinates of the lattice points of the dot patterns in the created images.

Figure 10:
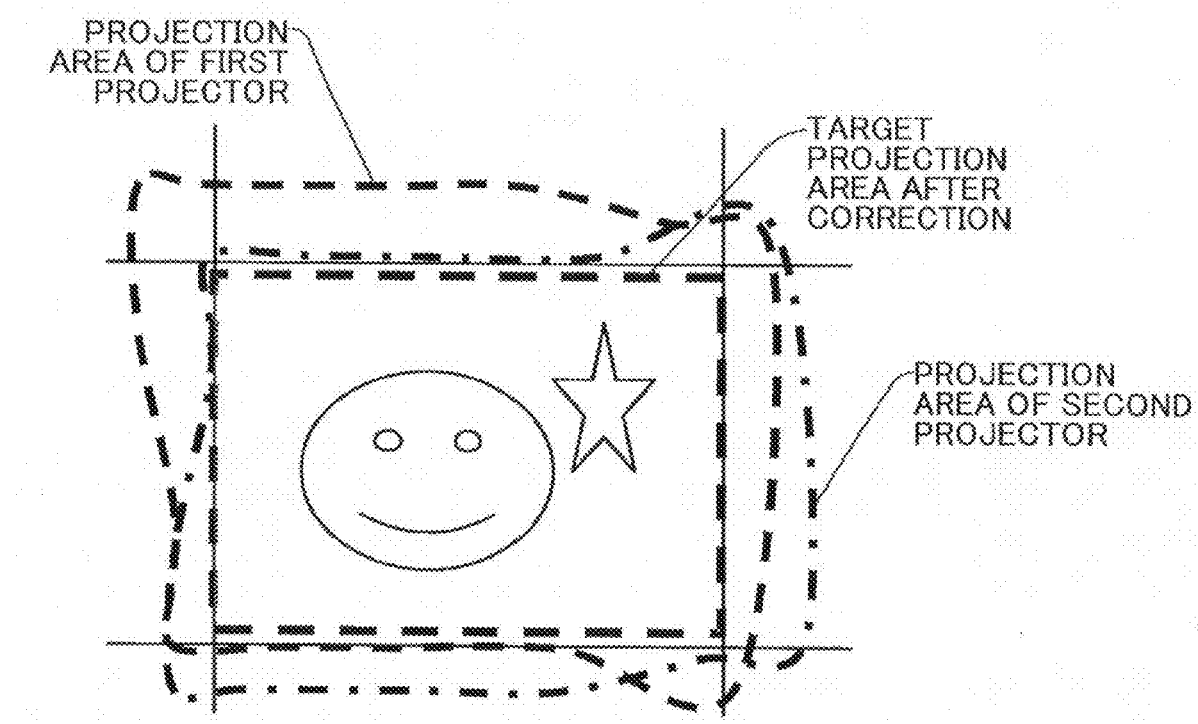
FIG. 10 is a diagram for explaining a target projection area after correction.

As a result, the projection areas (the surface areas where a white image is fully projected) of the first and second projectors 10A and 10B are detected (see FIG. 10).

In step S7-5, as shown in FIG. 10, the correction data receiver unit 32 determines a post-correction target projection area (a maximum-size content image area) where the content images after correction are to be projected to an AND area between the projection areas of the first and second projectors 10A and 10B. Namely, in step S7-5, the maximum-size content image area obtained by scaling with the aspect ratio of each content image retained is mapped to the AND area of the two projection areas.

Specifically, the maximum-size content image area is determined as follows. The positions of the four corner points of each of the projection areas of the dot patterns DP1 and DP2 (whose images are created by the digital camera 20) in the coordinate system of the digital camera 20 are known and the positions of the four sides of the rectangle of each of the projection areas (the upper side, the lower side, the left-hand side, and the right-hand side thereof) are also known. A rectangular region (indicated by the dotted line in FIG. 10) which is interposed between the upper side and the lower side of each of the projection areas of the projectors on the dot patterns in the created images and interposed between the left-hand side and the right-hand side of each of the projection areas is determined as the AND area between the projection areas of the first and second projectors 10A and 10B. To this rectangular region, the maximum size content image areas obtained by scaling with the aspect ratio of the content image maintained (in the example of the content image in FIG. 5A, the aspect ratio: 4:3) are assigned. In the example of FIG. 10, there is a slight margin in the vertical direction and centering is performed by inserting white space in each of the upper and lower sides of the content image.

In step S7-6, the correction data receiver unit 32 computes a distortion correction parameter for correcting distortion in the image data of the original content image and a deviation correction parameter for correcting a deviation in the image data of the original content image so that the content image may be projected on the post-correction target projection area.

Namely, in step S7-6, the centroid coordinates of each of the dots of the dot pattern DP1 in the created image are converted into the coordinates of a same-scale content image corresponding to the positions on the mapped content image.

Figure 11A:
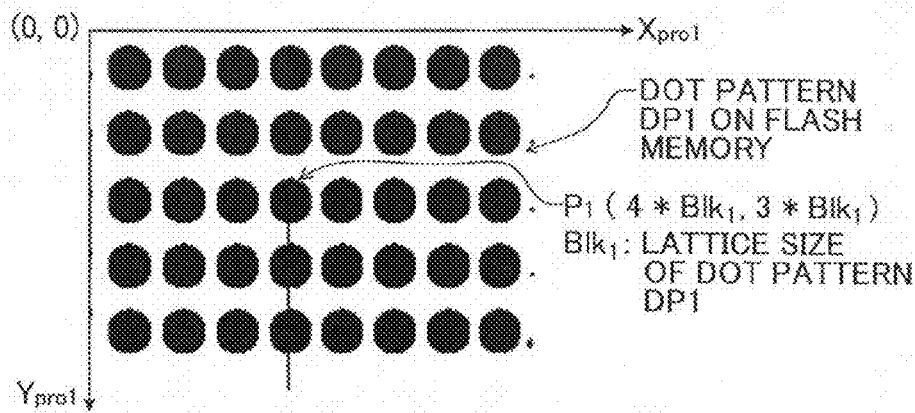
FIGS. 11A, 11B and 11C are diagrams for explaining an example of conversion of the coordinates of one of dots of the dot pattern DP1 into the coordinates of the dot on a same-scale original image corresponding to the position of the dot on a mapped projection content image.
Figure 11B:
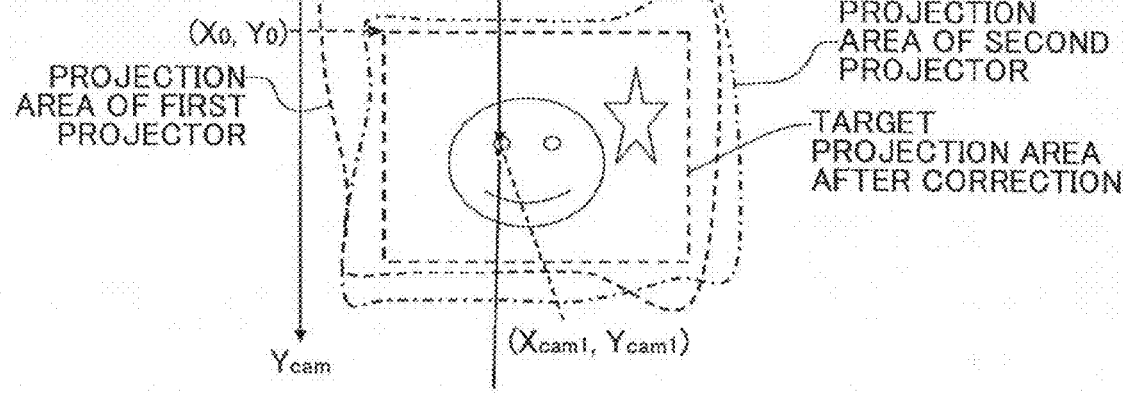
Figure 11C:
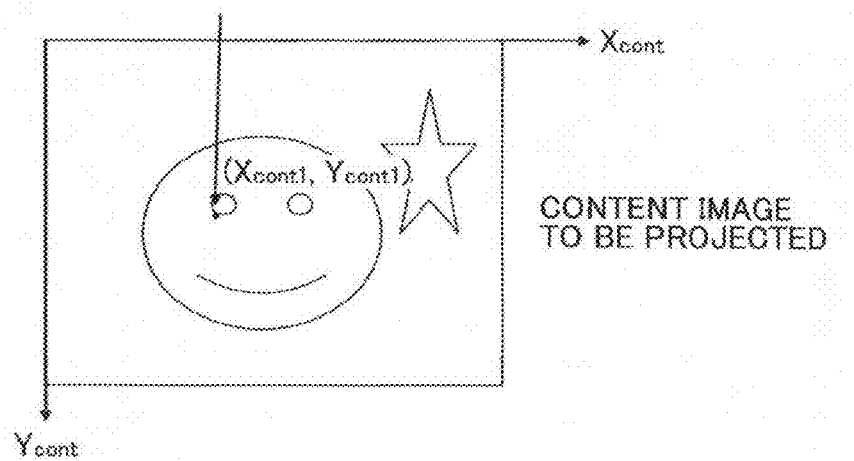

Specifically, a lattice point $P_1$ ($4*Blk_1$, $3*Blk_1$) (where $Blk_1$ is a lattice size of the dot pattern DP1) of the lattice points of the dot pattern DP1 on the first flash memory 35a output to the first projector 10A, as shown in FIG. 11A, is considered. The corresponding coordinates (Xcam1, Ycam1) of the lattice point $P_1$ on the projection image shown in FIG. 11B are computed, and the target projection area after correction, indicated by the rectangular dotted line in FIG. 11B, is mapped. In FIG. 11C, the coordinates of the lattice point $P_1$ on the same-scale (high resolution) content image are determined.

Suppose that $(X_0, Y_0)$ denotes the coordinates of the origin located at the upper left corner of the mapped content image area on the created image in FIGS. 11B and R denotes a scaling factor of the content image. The pixel coordinates (Xcont1, Ycont1) of the content image to be projected at the lattice point on the created image may be represented by the following formulas (2) and (3):

$$X\text{cont}1 = (X\text{cam}1 - X_0)/R \quad (2)$$

$$Y\text{cont}1 = (Y\text{cam}1 - Y_0)/R \quad (3)$$

The distortion correction parameter is implemented by the pixel coordinates (Xcont, Ycont) on the content image obtained for all the lattice points of the dot pattern DP1. This distortion correction parameter is sent to the first image data correction unit 34a.

In step S7-7, the centroid coordinates of each of the dots of the dot pattern DP2 in the created image are converted into the coordinates of the dot on the low-resolution image corresponding to the position of the dot on the mapped content image.

Figure 12A:
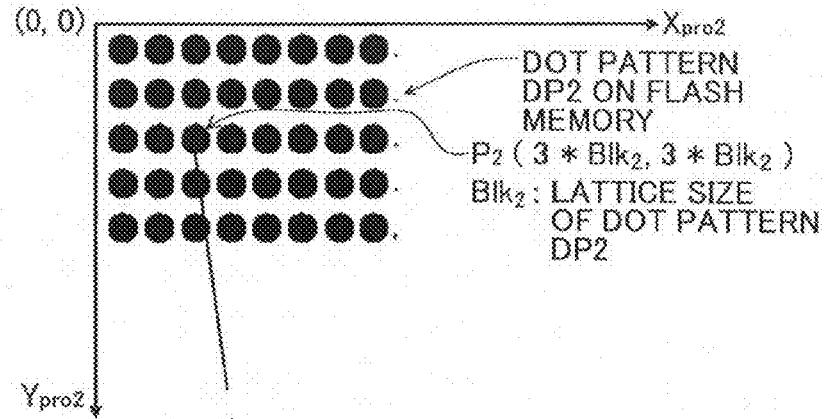
FIGS. 12A, 12B and 12C are diagrams for explaining an example of conversion of the coordinates of one of dots of the dot pattern DP2 into the coordinates of the dot on a low-resolution image, obtained from the original image, corresponding to the position of the dot on a mapped projection content image.
Figure 12B:
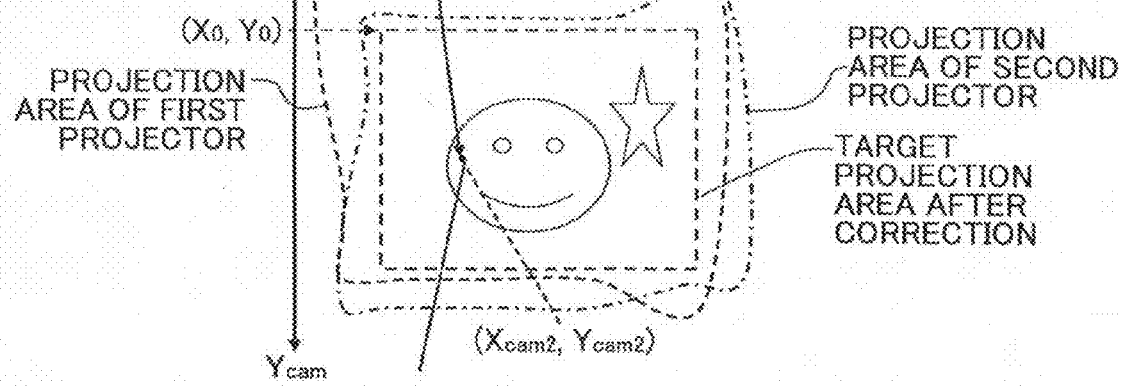
Figure 12C:
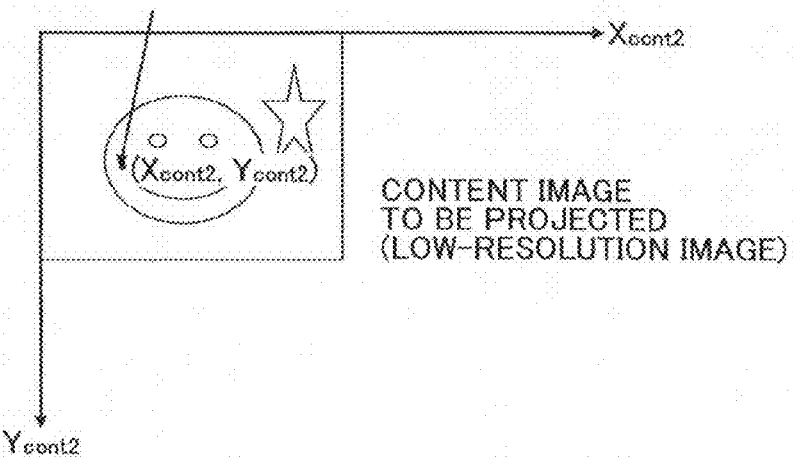

The conversion method used in step S7-7 is essentially the same as that used in step S7-6 except that the dot pattern DP2 on the second flash memory 35b shown in FIG. 12A and the content image shown in FIG. 12B correspond to the low-resolution image. The scaling factor R of the content image in this case is a scaling factor of the low-resolution image.

Next, the first correction image generation process (S10) is explained with reference to FIG. 13. FIG. 13 is a flowchart for explaining the first correction image generation process.

As shown in FIG. 13, in step S10-1, the first image data correction unit 34a determines the coordinates of the high resolution content image on the second frame memory 31b which are to be referenced for each of the dot positions of a first correction image.

In step S10-2, the first image data correction unit 34a computes the coordinates of the high resolution content image which are to be referenced for each of other positions than the dot positions by linear interpolation.

In step S10-3, the first image data correction unit 34a generates the first correction image for the first projector 10A based on the high resolution content image for projection according to the coordinates (decimal fractions) to be referenced, by a bilinear or bicubic pixel interpolation technique.

Next, the second correction image generation process (S11) is explained with reference to FIG. 14. FIG. 14 is a flowchart for explaining the second correction image generation process.

As shown in FIG. 14, in step S11-1, the second image data correction unit 34b determines the coordinates of the low resolution content image on the fourth frame memory 31d which are to be referenced for each of the dot positions of a second correction image.

In step S11-2, the second image data correction unit 34b computes the coordinates of the low resolution content image which are to be referenced for each of other positions than the dot positions by linear interpolation.

In step S11-3, the second image data correction unit 34b generates the second correction image for the second projector 10B based on the low resolution content image for projection according to the coordinates (decimal fractions) to be referenced, by a bilinear or bicubic pixel interpolation technique.

As a result, a geometric distortion and a deviation in the image data of the high resolution content image (whose resolution is the same as the resolution of the first projector 10A), received from the external memory 40, are corrected (the image data in a state where the geometric distortion and the deviation are eliminated), and the resulting image data are sent to the first projector 10A so that the corresponding image is projected on the screen surface by the first projector 10A. Further, the high-resolution content image (whose resolution is the same as the resolution of the first projector 10A) received from the external memory 40 is converted into a low-resolution content image, the geometric distortion and the deviation in the image data are eliminated, and the resulting image data are sent to the second projector 10B so that the corresponding image is projected on the screen surface by the second projector 10B. Accordingly, the two distortion-corrected projection images are displayed in the same size at the same position on the screen surface by superimposition.

The above-described image projection system 100 according to the embodiment projects two same images on the screen surface (a plane of projection) by superimposition, and includes the projectors 10A and 10B configured to have mutually different resolutions and project the same images on the screen surface, and the PC 30 (an image data output device) configured to output to the projectors 10A and 10B image data corresponding to the images with the resolutions of the projectors 10A and 10B, respectively.

In this case, the image data with the different resolutions of the projectors are output to the projectors, so that the images with the resolutions of the projectors are projected on the screen surface by the projectors and the two same images with the different resolutions are superimposed on the screen surface.

As a result, stack projection may be performed by combining the projectors with different resolutions. Hence, in the image projection system 100 according to the embodiment, the combination of projectors usable for stack projection is not limited and the flexibility of selecting the projectors may be increased.

On the other hand, in the image projection system according to the related art, the combination of projectors usable for stack projection has not been flexible. Even when a user owns several projectors with different resolutions, it has been necessary to purchase a new projector whose resolution is the same as a resolution of any of those projectors in order to perform stack projection with the image projection system according to the related art. Further, it has been necessary to select the projectors of the same resolution in order to perform stack projection with the image projection system according to the related art. Hence, the combination of projectors usable for stack projection has not been flexible.

FIG. 15A and FIG. 15B are diagrams for explaining resolutions of projection images (indicated in a one-dimensional fashion) when stack projection is performed using two projectors of the same resolution in comparative example 1 and comparative example 2, respectively. FIG. 15C is a diagram for explaining resolutions of projection images (indicated in a one-dimensional fashion) when stack projection is performed using two projectors with different resolutions (the present embodiment). The horizontal axis indicates coordinates of horizontal pixels (picture elements), and the vertical axis indicates a luminance value.

As shown in FIGS. 15A and 15B, in the comparative examples 1 and 2, stack projection is performed using two projectors of the same resolution, the luminance value doubles when the projection images are superimposed. If the positioning of the images is accurate, the resolution of the superimposed images is the same as the resolution of the original images.

As shown in FIG. 15C, in the image projection system 100 according to the embodiment, stack projection is performed using a high resolution projector 10A and a low resolution projector 10B. The resolution of the superimposed images obtained by using these projectors 10A and 10B is lower than a resolution in a case where two high resolution projectors are combined and higher than a resolution in a case where two low resolution projectors are combined. The luminance value obtained by using these projectors is also similar to the case of the resolution.

The resolutions of the image data are preset to the high resolution of the first projector 10A higher than the low resolution of the second projector 10B, and the PC 30 (the image data output device) includes the resolution converter unit 33 configured to convert the high resolution of image data to be output to the second projector 10B into the low resolution of the second projector 10B. In this case, the image corresponding to the high resolution image data may be projected with the high resolution by using the first projector 10A with the high resolution and the second projector 10B with the low resolution.

In the image projection system 100 according to the embodiment, the PC 30 (the image data output device) is configured to output to the projectors 10A and 10B image data of the dot patterns DP1 and DP2 whose resolutions are preset to the resolutions of the projectors 10A and 10B, respectively, in a time sequence. The image projection system 100 includes the digital camera 20 (an imaging unit) configured to create images of the dot patterns DP1 and DP2 which are projected on the screen surface by the projectors 10A and 10B in the time sequence. In this case, the correction data (correction parameters) of the image data may be obtained based on the dot patterns in the images created by the digital camera 20.

In the image projection system 100 according to the embodiment, the PC 30 (the image data output device) includes an image data correction unit including a distortion correction unit configured to correct distortion of the image data to be output to the corresponding one of the projectors based on the distortion correction data of the dot patterns in the created images. In this case, a distortion-corrected image in which the distortion is eliminated by the distortion correction unit may be projected on the screen surface.

In the image projection system 100 according to the embodiment, the PC 30 (the image data output device) includes an image data correction unit including a deviation correction unit configured to correct a deviation of the image data to be output to the projectors based on the deviation correction data of the dot patterns in the created images. In this case, a deviation-corrected image in which the deviation is eliminated by the deviation correction unit may be projected on the plane of projection accurately.

In the above embodiment, same images from the two projectors with different resolutions are projected on the display screen S by superimposition. The present disclosure is not limited to this embodiment. Same images from three or more projectors with different resolutions may be projected on the display screen S by superimposition. In either case, it is preferred that the image data from the external memory 40 are output to each of the projectors with the resolution of the corresponding one of the projectors.

In the above embodiment, the image data whose resolution is the same as the high resolution of the first projector are read from the external memory 40 and sent to the first projector without changing the resolution, while the read image data are converted into low-resolution image data (whose resolution is the same as the low resolution of the second projector) and sent to the second projector. However, the present disclosure is not limited to this embodiment. For example, the image data whose resolution is the same as the low resolution of the second projector may be read from the external memory 40 and sent to the second projector without changing the resolution, while the read image data may be converted into high-resolution image data (whose resolution is the same as the high resolution of the first projector) and sent to the first projector. Further, image data with another resolution different from the resolutions of the first and second projectors may be read from the external memory 40, converted into high-resolution image data (whose resolution is the same as the high resolution of the first projector) and sent to the first projector, while the read image data may be converted into low-resolution image data (whose resolution is the same as the low resolution of the second projector) and sent to the second projector.

In the above embodiment, the surface of the hung type screen S is utilized as an example of the plane of projection. The present disclosure is not limited to this embodiment. For example, the plane of projection may be any of a surface of a screen fixed to a wall of a building, a surface of a wall of a building, a surface of cloth, a surface of a panel, a surface of a board, and a surface of a windshield of a car.

In the above embodiment, the dots are arrayed in a matrix form. The present disclosure is not limited to this embodiment. In short, the dots in each of the dot patterns may be arrayed in a two dimensional form.

In the above embodiment, the dot pattern is used as the pattern projected on the screen S. The present disclosure is not limited to this embodiment. For example, a grid pattern may be used instead as the pattern projected on the screen S. In this case, instead of the dots of the dot pattern, the intersections of straight lines of a grid pattern may be used or the rectangular areas surrounded by straight lines of a grid pattern may be used.

In the above embodiment, the dot pattern is implemented by an array of black circles (black dots) in a white background. The present disclosure is not limited to this embodiment. For example, the dot pattern may be implemented by any of an array of white dots (white circles, white ellipses, white polygons, etc.) in a black background, an array of black polygons in a white background, and an array of black ellipses in a white ground. In the present disclosure, dots whose color is deeper than a background color of the dot pattern are referred to as black dots, and dots whose color is lighter than the background color of the dot pattern are referred to as white dots. Namely, the black dots and the white dots may include halftone dots.

In the above embodiment, the image data of the dot patterns are stored in the flash memories connected to the projectors, respectively. The present disclosure is not limited to this embodiment. For example, a pattern generation unit may be connected to each of the projectors, and the pattern generation unit may be configured to generate at least one pattern and send the generated pattern to each of the projectors.

The composition of the projection portion 16 is not limited to the composition in the above embodiment. The composition of the projection portion 16 in the above embodiment may be modified suitably. For example, in the above embodiment, the light from the light source 80 is modulated in accordance with image information by the DMD 94. However, the present disclosure is not limited to this embodiment. For example, the light source may be modulated and driven in accordance with image information. In this case, instead of the DMD 94, any of a two-dimensional MEMS scanner, a two-dimensional galvanometer scanner, a set of MEMS mirrors, a set of galvanometer mirrors, a transmission type liquid crystal panel, and a reflection type liquid crystal panel may be used.

In the above embodiment, the PC 30 is utilized as the image data output device. However, the present disclosure is not limited to this embodiment. For example, another device configured to output image data to each of the projectors may be utilized. Specifically, any of a tablet terminal, such as a smart phone, a DVD player, a Blu-ray disc player, and a videoconference device configured to transmit and receive at least image data may be utilized as the image data output device.

In the above embodiment, the controller (the PC 30) is configured to read image data from the external memory 40 and output the image data to the projectors 10A and 10B. However, the present disclosure is not limited to this embodiment. For example, the controller may be configured to output to the projectors 10A and 10B image data read from an internal hard disk drive or image data distributed from the Internet.

In the above embodiment, the projection portion is configured into a short focus system. However, the projection portion may not be a short focus system. In such a case, a MEMS (microelectromechanical system) mirror or a galvanometer mirror may be used instead of the mirror having a refractive power (the free-surface mirror 98).

As described in the foregoing, with the image projection system according to the present invention, the flexibility in selecting the projectors usable for stack projection may be increased.

The image projection system according to the present invention is not limited to the above-described embodiments, and variations and modifications may be made without departing from the scope of the present invention.

The present application is based upon and claims the benefit of priority of Japanese Patent Application No. 2013-051153, filed on Mar. 14, 2013, the content of which are incorporated herein by reference in their entirety.

What is claimed is:

1. An image projection system which projects a plurality of same images on a plane of projection by superimposition, comprising:
    a plurality of projectors configured to have mutually different resolutions and project the plurality of same images on the plane of projection; and
    a processor to output to the plurality of projectors image data corresponding to the plurality of same images with the resolutions of the plurality of projectors, respectively,
    wherein the resolutions of the image data are preset to a highest resolution of a first projector among the resolutions of the plurality of projectors, and the processor includes a resolution converter configured to convert the highest resolution of image data to be output to one of the plurality of projectors other than the first projector into a resolution of said one of the plurality of projectors.

2. The image projection system according to claim 1, wherein the processor is configured to output to the plurality of projectors image data of a plurality of patterns whose resolutions are preset to the resolutions of the plurality of projectors, respectively, in a time sequence, and
    the image projection system further comprises an imaging device configured to create images of the plurality of patterns projected on the plane of projection in a time sequence by the plurality of projectors.

3. The image projection system according to claim 2, wherein the processor includes an image data correction unit configured to correct the image data to be output to the plurality of projectors based on the plurality of patterns in the created images.

4. The image projection system according to claim 3, wherein the image data correction unit includes a distortion correction unit configured to correct distortion of the image data to be output to the plurality of projectors based on distortion correction data of the plurality of patterns in the created images.

5. The image projection system according to claim 3, wherein the image data correction unit includes a deviation correction unit configured to correct a deviation of the image data to be output to the plurality of projectors based on deviation correction data of the plurality of patterns in the created images.

6. The image projection system according to claim 2, wherein the plurality of patterns include a plurality of dot patterns in which dots are arrayed in a two dimensional form.

7. An image projection method which projects a plurality of same images on a plane of projection by superimposition, comprising:
    outputting to a plurality of projectors having mutually different resolutions image data corresponding to the plurality of same images with the resolutions of the plurality of projectors, respectively; and
    projecting the image data by the plurality of projectors,
    wherein the resolutions of the image data are preset to a highest resolution of a first projector among the resolutions of the plurality of projectors, and
    the outputting the image data includes converting, by a resolution converter unit, the highest resolution of image data to be output to one of the plurality of projectors other than the first projector into a resolution of said one of the plurality of projectors.

8. The image projection method according to claim 7, wherein the outputting the image data includes:
    outputting to the plurality of projectors image data of a plurality of patterns whose resolutions are preset to the resolutions of the plurality of projectors, respectively, in a time sequence;
    creating images of the plurality of patterns projected on the plane of projection in a time sequence by the plurality of projectors; and
    correcting the image data to be output to the plurality of projectors based on the plurality of patterns in the created images.

* * * * *